Figure 1:
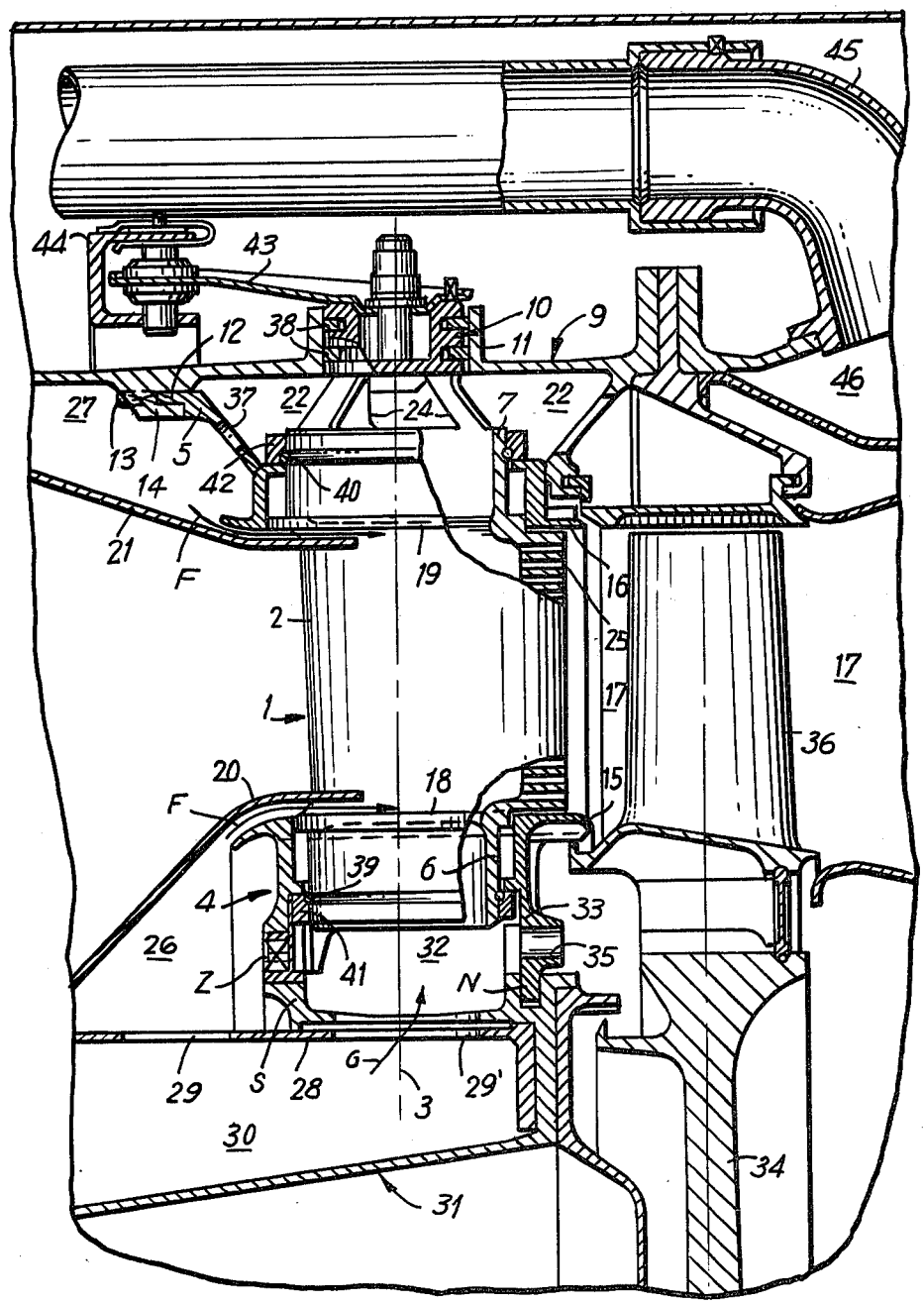

United States Patent [19]

Weiler

[11] 4,314,791
[45] Feb. 9, 1982

[54] VARIABLE STATOR CASCADES FOR AXIAL-FLOW TURBINES OF GAS TURBINE ENGINES

[75] Inventor: Wolfgang Weiler, Dachau, Fed. Rep. of Germany

[73] Assignee: Motoren- und Turbinen-Union Munchen GmbH, Munich, Fed. Rep. of Germany

[21] Appl. No.: 18,221

[22] Filed: Mar. 6, 1979

[30] Foreign Application Priority Data

Mar. 9, 1978 [DE] Fed. Rep. of Germany ....... 2810240

[51] Int. Cl.³ .......................... F01D 7/00; F01D 25/12
[52] U.S. Cl. ..................................... 415/115; 415/159
[58] Field of Search .............. 415/115, 159, 117, 160, 415/139, 116, 161, 162

[56] References Cited

U.S. PATENT DOCUMENTS

| | | | |
|---|---|---|---|
| 2,919,890 | 1/1960 | Smith et al. | 415/135 |
| 3,224,194 | 12/1965 | DeFeo et al. | 415/172 A |
| 3,584,458 | 6/1971 | Wetzler | 415/115 |
| 3,588,237 | 1/1971 | Wall | 415/160 |
| 3,588,269 | 6/1971 | Wall | 415/115 |

FOREIGN PATENT DOCUMENTS 1576988 9/1971 Fed. Rep. of Germany .

*Primary Examiner*—Robert E. Garrett

*Attorney, Agent, or Firm*—Haseltine and Lake

[57] ABSTRACT

This invention relates to a variable stator cascade for axial-flow turbines of gas turbine engines, especially for high-pressure turbines, where the turbine nozzle vanes are each pivotally arranged about an axis of rotation and are cooled when in operation. The inner and outer rings of the variable stator cascade are formed of interlocking inner and outer ring segments which provide circumferential sealing action where each turbine nozzle vane is pivotally arranged and disconnectably connected by respective root and tip side pivot pins in association with each respective inner and outer ring segments. A continuous inner stator ring, is centrally located at inner ring segments of the stator cascade by means of teeth and a slot-and-key arrangement whereby each outer ring segment arranged at the turbine casing cooperates with the vane attachment assembly to radially guide the nozzle vane and associated inner ring segment. A variable stator cascade is secured in radial, axial and circumferential position by means of the respective outer ring segments. The turbine nozzle vanes have at their respective root and tip sides, vane plates arranged in the area of the inner and outer walls of a turbine duct attached to which are the pivot pins arranged outside the turbine duct and which take the shape of tubular cylindrical cooling air ducts which communicate with the interior of the vane.

9 Claims, 2 Drawing Figures

VARIABLE STATOR CASCADES FOR AXIAL-FLOW TURBINES OF GAS TURBINE ENGINES

BACKGROUND OF THE INVENTION

This invention relates to a variable stator cascade for axial-flow turbines of gas turbine engines, especially for high-pressure turbines, where the turbine nozzle vanes are each pivotally arranged about an axis of rotation and are cooled when in operation.

Theoretical considerations have shown gas turbine engines with variable turbine stator cascades provide a number of desirable properties over gas turbine engines with rigid stator cascades. Analysis of the existing relationships has indicated a number of advantages. For example:

1. Improvement of the part-load consumption of heat exchanger gas turbines (fixed compressor turbine, variable power turbine).
2. Improved life of components subject to low cycle fatigue (LCF) of material fatigue produced by low-frequency pulsating load and thermal shock, improved acceleration performance and part-load consumption for jet engines and turboshaft engines without heat exchangers (variable compressor turbine and perhaps variable power turbine).
3. Changes thrust performance and specific fuel consumption of jet engines. Such engine, known as variable-cycle engines (VCE) in the Anglo-American literature, exhibit various combinations of variable high-pressure, intermediate-pressure and low-pressure turbines, depending on the degree of complexity of the engine.

Previously implemented or disclosed proposals for variable turbine stator cascades almost invariably involve uncooled stator cascades of low-pressure turbines, where the nozzle vanes are all pivotally arranged and where each nozzle vane is carried by one pin only in the outer ring of the stator cascade. In this arrangement, the inner ring of the stator cascade does not form a structural member of the stator cascade but must be supported by an additional, spider-type support. This support, serving as it does no function in the conversion of the energy in the working medium into useful energy, inherently causes flow losses, and the temperature of the working medium may be such that this component also requires cooling. A further disadvantage embarrassing this construction of the variable stator cascade is the fact that, regardless of the vane position at the time, the clearance between the vanes and the inner ring of the cascade varies as a result of different thermal expansion of the variable vanes and the outer ring of the cascade on the one hand and of the spider support and the inner ring of the stator cascade on the other, causing additional losses in the process. A further disadvantage of this construction of the stator cascade is the limited supply of cooling air flowing to the vane through the pivot pin, which disqualifies it for use as a turbine inlet stator cascade in engines exhibiting elevated turbine inlet temperatures.

Gas turbine engines having variable turbine nozzle vanes have been disclosed by, e.g., U.S. Pat. Nos. 3,919,890, 3,224,194, 3,558,237 and British Pat. No. 951,298. Within the problem area here discussed, however, there is in these teachings no showing or suggestion of the present invention.

SUMMARY OF THE INVENTION

It is the main object of the present invention to eliminate the disadvantages of the prior art.

It is another object of the present invention to provide an apparatus with low stress levels at transient conditions.

The principal features of the present invention are directed to a variable stator cascade apparatus for axial-flow turbines, especially for high-pressure turbines of gas turbine engines, having nozzle vanes each pivotally arranged about an axis of rotation and employing provisions for cooling when in operation, wherein: the inner and outer rings of the variable stator cascade are formed of interlocking inner and outer rings segments which provide circumferential sealing action where each turbine nozzle vane is pivotally arranged and disconnectably connected by respective root and tip side pivot pins in association with each respective inner and outer ring segments; a continuous inner stator, said ring is centrally located at inner ring segments of the stator cascade by means of teeth and a slot-and-key arrangement whereby each outer ring segment arranged at the turbine casing cooperates with means for vane attachment to radially guide the nozzle vane and associated inner ring segment; a variable stator cascade is secured in radial, axial and circumferential position by means of the respective outer ring segments; and the turbine nozzle vanes have at their respective root and tip sides, vane plates arranged in the area of the inner and outer walls of a turbine duct, attached to which are the pivot pins arranged outside the turbine duct and which take the shape of tubular cylindrical cooling air ducts which communicate with the interior of the vane.

Further objects and advantages will be best understood with respect to the accompanying specification, claims and drawings:

IN THE DRAWINGS

FIG. 1. Is an axial view of a high-pressure turbine section and variable stator cascade used in a turbojet engine, and FIG. 2. Is an axial view of a low-pressure turbine section and variable stator cascade associated with the turbojet engine cited under FIG. 1.

DESCRIPTION OF THE INVENTION

FIG. 1 illustrates a variable stator cascade 1 for an axial-flow high-pressure turbine of a turbojet engine, where the nozzle vanes 2 are pivotally arranged in both the root and tip areas about a common axis of rotation 3 and have provision for cooling when in operation. In this arrangement the variable stator cascade 1 is composed of internally and externally circumferentially interlocking inner and outer ring segments 4, 5 to provide circumferential sealing action wherein at least one nozzle vane 2 is pivotally arranged and disconnectably connected by its root and tip side pivot pins 6, 7 to or in an associated inner and outer ring segments 4, 5. Each nozzle vane 2 of the variable stator cascade 1 is additionally centrally located via its associated inner ring segment 4, to a component 31 of the turbine stator. The respective associated outer ring segment 5 arranged on the turbine casting 9 cooperates with the vane attaching means: (the arrangement of which will be described in more detail hereinafter) to radially guide the nozzle vane 2 and associated inner ring segment 4. The variable stator cascade 1 is axially and circumferentially secured in position by means of the respective outer ring segments 5.

In this arrangement the outer ring segments 5 are each circumferentially suspended in extending slots 12 of the turbine casting 9 in order to engage, for circumferential fixation in axially extending recesses of a hook-shaped casing component 14, by means of pins 13. The nozzle vanes 2 exhibit at their root and tip sides, vane plates 18, 19 arranged in the inner and outer wall sections 15, 16 of the inner and outer ring segments 4, 5. These inner and outer wall sections 15, 16 forming parts of the inner and outer wall stucture of the turbine duct 17, attached to which are the pivot pins 6, 7 which given as large a diameter as possible and being arranged outside the turbine duct 17, take the shape of tubular cylindrical cooling air ducts and communicate with the interior of the vane. The ceramic bearing bushings arranged in the inner and outer ring segments can, if necessary, exhibit crowned outer diameters.

The inner and outer ring segments 4, 5 as well as the vane plates 18, 19, may be cooled by film cooling. For the purpose, the inner and outer end portions 20, 21 of the walls of an annular combustion chamber project into the variable stator cascade 1 to assist the formation of a cooling film. The resulting cooling air flow is indicated by arrowheads F. An intermediate duct or annulus 22 arranged between the outer ring segments 5 and the abutting outer turbine casing 9 is energized with cooling air and which communicates, via ports 24 in the actuating pins 10 of the nozzle vanes 2, with the tubular cylindrical pivot pin 7 to supply cooling air to the interior of the vanes. Although this is not illustrated on the drawing, the nozzle vanes 2 being of the hollow type, can be provided with cooling inserts for optimum cooling, wherein the cooling air blown off from the nozzle vane to join the gas stream in the turbine duct 17 via chordwise holes 25 provided in the trailing edge of the vane.

Further intermediate ducts or annuli 26, 27 of the annular combustion chamber energized with relatively cool air from the engine compression are arranged between the end portions 20, 21 of the annular combustion chamber walls projecting into the variable stator cascade 1, or between the inner and outer ring segments 4, 5 and adjacent turbine stator components. On one side, the stator components are formed by a circumferentially annularly extending structural component 28 which connect to the end portion 20 of the inner combustion chamber wall and which, through ports 29, establish communication for the cooling air between the annulus 26 and a further annulus 30, essentially arranged between the structural component 28 and a component 31, which is an extension of the combustion chamber outer casing. This is provided with a continuous stator inner ring S which in turn is centrally located at that stator cascade inner ring segments 4 by means of teeth Z and a key and slot arrangement N.

A further annulus 32 at the root-end of the stator cascade 1 is formed by way of the stator component 31 on the one hand and by way of lateral wall and guide sections of the inner ring segments 4 on the other hand. The further annulus 32 communicates through the pivot pins 6 at the vane roots, with the interior or the cooling inserts of the vanes and is energized with cooling air from the annulus 30 chiefly through the rear ports 29 in the structural component 28 (arrowhead G).

The respective rear wall or guide section 33 of the inner ring segment 4, exhibits preswirl nozzles 35 pointing in the direction of the rotor disc 34 and circumferentially provides cooling and sealing air, where the rotor blades carried on the rotor disk 34 of the high-pressure turbine are indicated by the numeral 36.

As it will also become apparent from FIG. 1, the outer ring segments 5 exhibit holes 37 to establish communication for the cooling air between the annuli 27 and 22.

With the variable stator cascade of FIG. 1, then, the turbine nozzle vanes 2 can be intensively cooled also in their bearing area, while concurrently being supplied with cooling air from the top and from below.

The actuating pins 10 of the nozzle vanes 2 exhibit piston ring type sealing elements 38 where they pass through the turbine casing 9. The actuating pin is smaller in diameter than the allowable hole in the turbine casing. The latter being split in the plane of the actuating pin, which will permit displacement of the variable vanes relative to the outer casing to an extent allowed by the sliding travel of the piston rings (e.g., at transient operating conditions.)

Still with reference to FIG. 1, the inner and outer ring segments 4, 5, as well as the nozzle vanes 2, are fixed in their relative positions by means of circlips 39, 40 fitted to the pivot pins 6, 7, with locking bushings 41, 42 seated over the circlips.

To actuate the stator cascade 1, all actuating pins 10 of the turbine nozzle vanes 2 are coupled together by means of actuating levers 43 pivotally connected to a rotatably arranged vane actuating ring 44.

Figure 2:
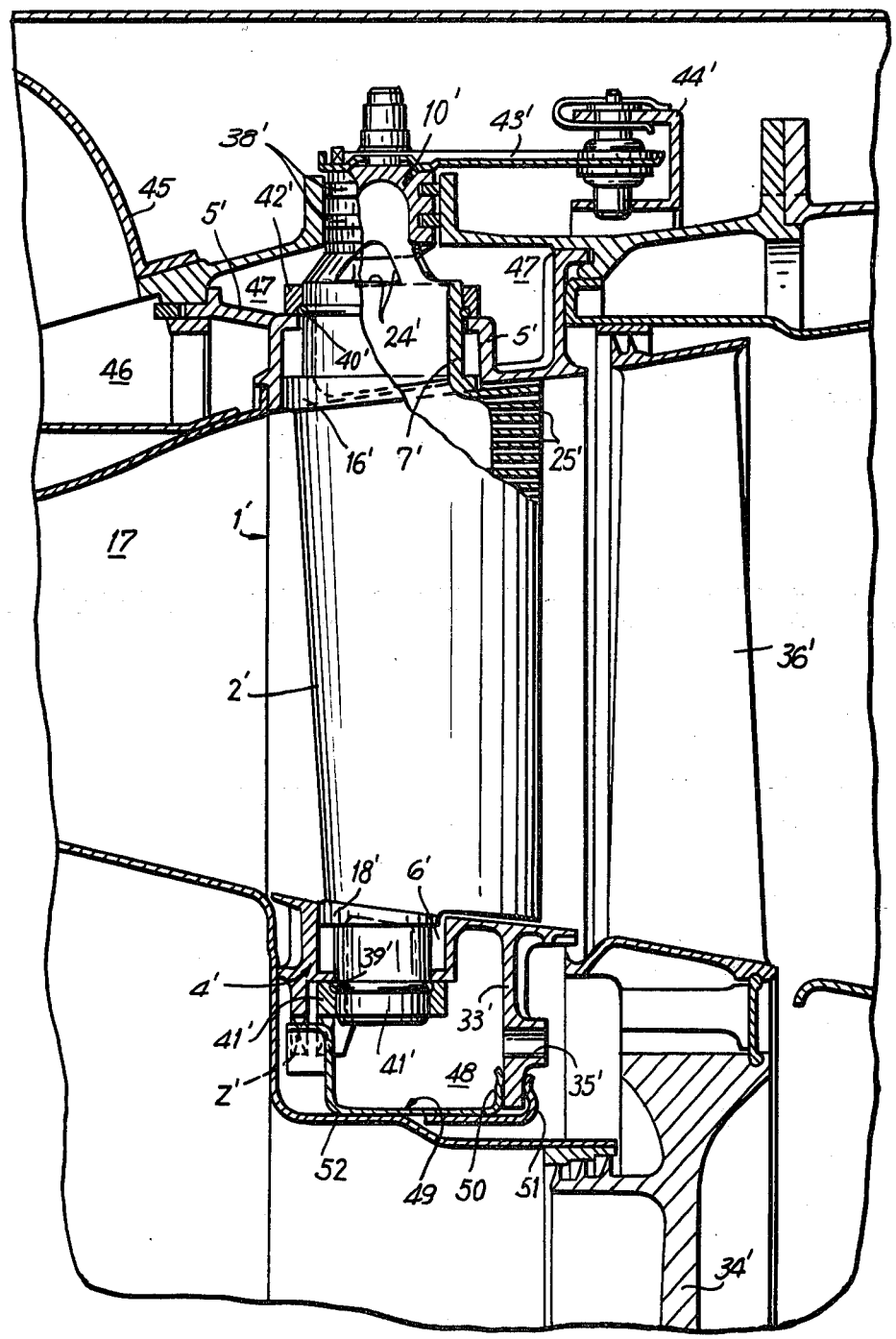

FIG. 2 illustrates a low-pressure turbine arranged, in the same turbine engine, downstream of the high-pressure turbine of FIG. 1. The turbine engine is energized with exhaust gas, where those components of the low-pressure turbine of FIG. 2 which in construction, arrangement and function are essentially identical in arrangement, construction and operation to the components of the high-pressure turbine of FIG. 1 are indicated by the numerals 1', 2', 3' etc.

A first appreciable difference to be noted between the arrangement of FIG. 2 and that of FIG. 1 is that with the variable cascade 1' of FIG. 2. The cooling air is supplied exclusively through the outer ring segments in an inward direction, where the cooling air tapped at a suitable point of the compressor first flows, through a lateral bypass duct 45, into an annulus 46 and next, through ports in the outer ring segments 5', into an annulus 47 and from there, through ports 24' and then again through the pivot pins 7', into the cavities or the cooling inserts of the turbine nozzle vanes 2'. While a portion of the incoming cooling air reaches the turbine duct 17 through holes in the trailing edge 25' of the vane and joins the gas stream, the remaining portion of the cooling air reaches, through the root-end pivot pin 6', an annulus 48 adjacent to the pin; the annulus being arranged between the wall or guide sections of the inner ring segments 4' and a lower locating plate 49 taking the shape of a continuous stator inner ring. The cooling air escaping from the annulus 48 is then carried, through the preswirl nozzles 35' arranged in the rear wall or guide sections 33', to cool the rotor blades 36' of the low-pressure turbine or to serve as sealing air. The rear portions 50, 51 of the locating plate 49 are bent upwards in clamp-fashion to provide radially flexible guidance for the rear wall or guide sections 33' of the inner ring segments 4'. The location plate 49 is attached to a portion 52 of the inner wall 15 of the turbine duct 17, this portion exhibiting an outward bend, such that the surfaces of the inner ring segments 4' facing the gas stream and the root-side vane plates 18' form continuous extensions of the contour of the inner wall 15 of the turbine duct 17.

FIG. 2 deviates from FIG. 1 also in that it omits the film cooling provisions on both the root and tip sides of the nozzle vanes 2' of the stator cascade 1'.

In contrast with the arrangement illustrated in FIG. 1, bearing support for the variable nozzle vanes is provided in the outer ring segments on the one side and in the turbine casing on the other, the casing again being split in the plane of the actuating pin.

The invention described in light of FIGS. 1 and 2 provides the following advantages:

Adaption of a known principle of construction, that of segmented nozzles, to make for managable operational characteristics at transient operating conditions.

Use of optimum cooling and manufacturing methods for both the nozzle vanes and the stator inner and outer ring segments.

Neat construction using simple and at least partially time-tested structural elements.

Low stress levels of the components involved even at transient operating conditions.

BEST MODE OF THE INVENTION

A variable stator cascade apparatus for axial-flow turbines, especially for high-pressure turbines of gas turbine engines, having nozzle vanes each pivotally arranged about an axis of rotation and employing provisions for cooling when in operation, wherein: the inner and outer rings of the variable stator cascade are formed of interlocking inner and outer ring segments (4,5) which provide circumferential sealing action where each turbine nozzle vane (2) is pivotally arranged and disconnectably connected by respective root and tip side pivot pins (6, 7) in association with each respective inner and outer segment; a continuous inner stator ring (S), said ring is centrally located at inner ring segments (4) of the stator cascade by means of teeth (Z) and a slot-and-key arrangement (4), whereby each outer ring segment (5) arranged at the turbine casing (9) cooperates with means for vane attachment to radially guide the nozzle vane and associated inner ring segment; a variable stator cascade (1) is secured in radial, axial and circumferential position by means of the respective outer ring segments; and the turbine nozzle means (2) have at their respective root and tip sides, vane plates (18, 19) arranged in the area of the inner and outer walls of a turbine duct (17), attached to which are the pivot pins (6, 7) arranged outside the turbine duct and which take the shape of tubular cylindrical cooling air ducts and which communicate with the interior of the vane.

Many modifications and variations of the present invention are possible in light of the above teachings. It is, therefore, to be understood that within the scope of the appended claims, the invention may be practiced otherwise than as particularly described.

What is claimed is:

1. A variable stator cascade apparatus for axial-flow turbines, particularly for high-pressure turbines of gas turbine engines comprising: nozzle vanes each pivotally arranged about an axis of rotation and having cooling means when in operation; the variable stator cascade being formed of circumferentially interlocking inner and outer ring segments providing circumferential sealing action so that at least one turbine nozzle vane is pivotally arranged and disconnectable connected by respective root and tip side pivot pins in association with each respective inner and outer ring segment; a continuous inner stator ring centrally located at inner ring segments of the stator cascade by way of attachment means comprising teeth and a slot-and-key arrangement so that each outer ring segment arranged at the turbine casing cooperates with said attachment means to radially guide said at least one turbine nozzle vane and associated inner ring segment; said nozzle vanes secured in radial, axial and circumferential position by said outer ring segment; said nozzle vanes having at their respective root and tip sides, vane plates arranged in the area of the inner and outer walls of a turbine duct, said pivot pins being attached to said vane plates and arranged outside the turbine duct, said pivot pins comprising further tubular cylindrical cooling air ducts communicating with the interior of the vane.

2. A variable stator cascade apparatus as claimed in claim 1, including circlips fitted to the pivot pins with locking bushings installed over the circlips thus defining the radial position of the nozzle vanes at the inner and outer ring segments.

3. A variable stator cascade apparatus as claimed in claim 1, including means for supplying cool air between said segments and said vane plates, said inner and outer ring segments and the vane plates being cooled by film cooling.

4. A variable stator cascade apparatus as claimed in claim 1, said apparatus being an inlet stator cascade for the high-pressure turbine of a gas turbine engine, said gas turbine engine comprising an annular combustion chamber end portions of inner and outer flame tube wall of said annular combustion chamber projecting into the variable stator cascade thereby providing cooling flow passages with the adjacent wall sections of said inner and outer ring segments, and for providing a cooling film, said flow passages being energized with cooling air from the respective inner and outer air flow ducts of the annular combustion chamber.

5. A variable stator cascade apparatus as claimed in claim 1, including an intermediate duct formed between the outer ring segments and the adjacent outer turbine casing on the one hand and adjacent sections of actuating portion and bushing on the other hand, said intermediate duct being energized with cooling air and communicating with said actuating portions of said pivot pins via ports in said actuating portions and thereby feeding cooling air into the interior of the vanes.

6. A variable stator cascade apparatus as claimed in claim 4, including intermediate ducts formed between said end portions.

7. A variable stator cascade apparatus as claimed in claim 5, wherein said actuating pins pass through the turbine casing, and sealing elements for sealing said actuating pins.

8. A variable stator cascade apparatus as claimed in claim 1, wherein the outer ring segments are fitted with holes for passing cooling air.

9. A variable stator cascade apparatus as claimed in claim 1, wherein said tip and root side pivot pins of the nozzle vanes are formed of ceramic material and have a crowned surface.

* * * * *

UNITED STATES PATENT AND TRADEMARK OFFICE
CERTIFICATE OF CORRECTION

PATENT NO. : 4,314,791
DATED : February 9, 1982
INVENTOR(S) : Wolfgang Weiler

It is certified that error appears in the above-identified patent and that said Letters Patent are hereby corrected as shown below:

Column 1, line 65: "3,919,890" should be --2,919,890--.

Column 2, line 15: "rings" should be --ring--.

Column 3, line 12: "stucture" should be --structure--.

Column 3, line 41: "compression" should be --compressor--.

Column 5, line 38: "inner and outer segment" should be --inner and outer ring segment--.

Signed and Sealed this

Sixth Day of July 1982

[SEAL]

Attest:

GERALD J. MOSSINGHOFF

Attesting Officer    Commissioner of Patents and Trademarks